No. 789,887. PATENTED MAY 16, 1905.
A. C. STILES.
INSECT GATHERING MACHINE.
APPLICATION FILED FEB. 1, 1905.

2 SHEETS—SHEET 1.

Witnesses
Alfred C. Stiles, Inventor.
by C. A. Snow & Co.,
Attorneys

No. 789,887. PATENTED MAY 16, 1905.
A. C. STILES.
INSECT GATHERING MACHINE.
APPLICATION FILED FEB. 1, 1905.
2 SHEETS—SHEET 2.
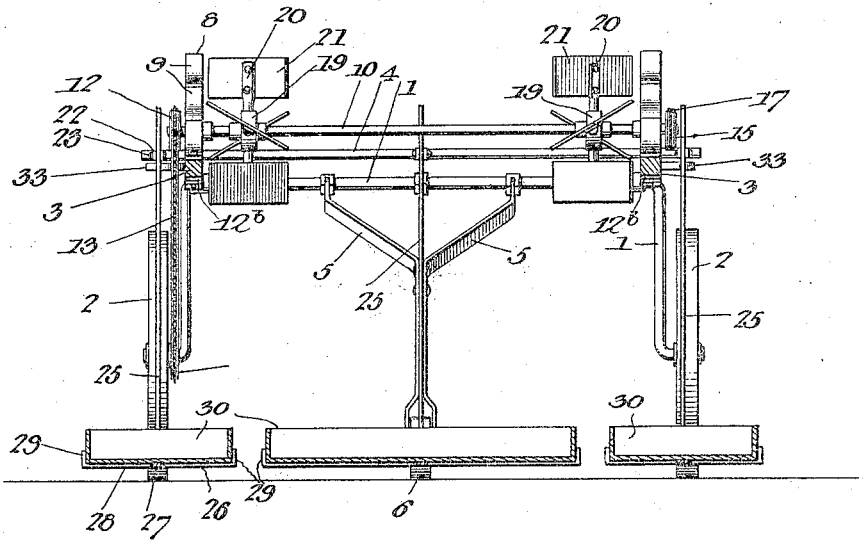
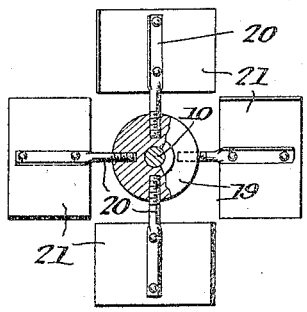
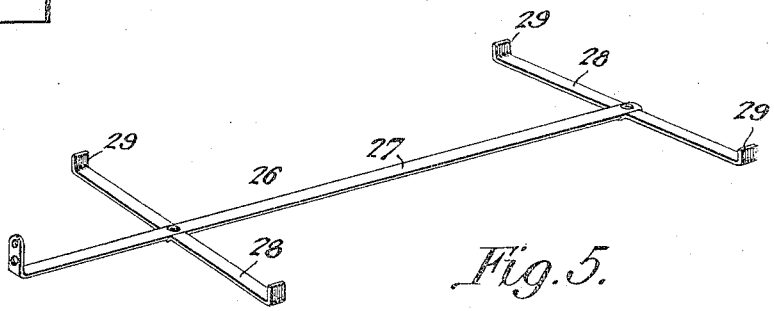
Witnesses
Alfred C. Stiles, Inventor,
by Attorneys No. 789,887.

Patented May 16, 1905.

UNITED STATES PATENT OFFICE.

ALFRED CLOSURE STILES, OF RIPLEY, TEXAS.

INSECT-GATHERING MACHINE.

SPECIFICATION forming part of Letters Patent No. 789,887, dated May 16, 1905.

Application filed February 1, 1905. Serial No. 243,713.

*To all whom it may concern:*

Be it known that I, ALFRED CLOSURE STILES, a citizen of the United States, residing at Ripley, in the county of Titus and State of Texas, have invented a new and useful Insect-Gathering Machine, of which the following is a specification.

This invention relates to machines for gathering various insect pests—such as boll-weevils, boll-worms, caterpillars, potato-bugs, and the like—from plants infested thereby; and it has among its objects to simplify and improve the construction and operation of this class of machines.

With these and other ends in view, which will readily appear as the nature of the invention is better understood, the same consists in the improved construction and novel arrangement and combination of parts, which will be hereinafter fully described, and particularly pointed out in the claims.

In the accompanying drawings there has been illustrated a simple and preferred form of embodiment of the invention, it being, however, understood that no limitation is necessarily made to the precise structural details therein exhibited, but that the right is reserved to any changes, alterations, and modifications to which recourse may be had within the scope of the invention and without departing from the spirit or sacrificing the efficiency of the same.

Figure 1:
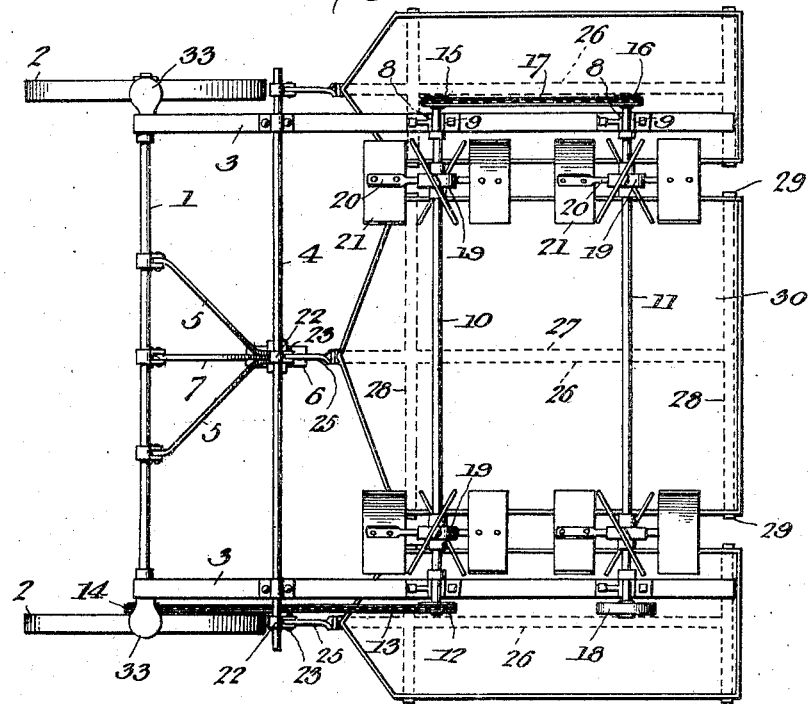
Figure 2:
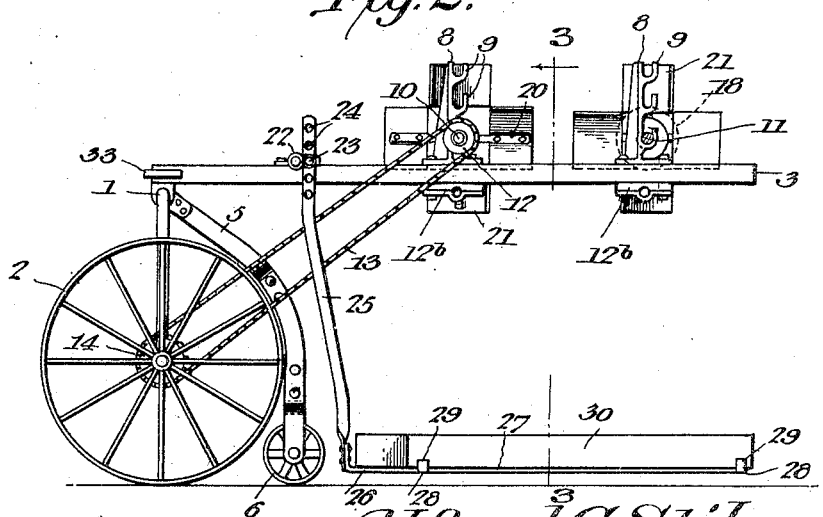

In said drawings, Figure 1 is a top plan view of a device constructed in accordance with the principles of the invention. Fig. 2 is a side elevation of the same. Fig. 3 is a transverse sectional view taken on the line 3 3 in Fig. 2. Fig. 4 is a detail view, partly in section, of one of the beaters connected with the device. Fig. 5 is a perspective detail view of one of the pan-carrying frames or spiders.

Corresponding parts in the several figures are indicated throughout by similar characters of reference.

The frame of the improved machine includes an arched axle 1, upon the spindles of which the ground-wheels 2 2 are journaled. Extending rearwardly from the axle and connected securely therewith adjacent to the shoulders thereof are the side bars 3 3, upon which a cross-bar 4 is supported. A yoke or bracket member 5, connected securely with and extending downwardly and rearwardly from said axle, carries a ground-engaging wheel 6. A central brace 7 serves to strengthen or reinforce the connection of the yoke with the axle.

Suitably bolted or otherwise secured upon the side members 3 of the frame are pairs of uprights 8 8, each of which is provided with a plurality of hook-shaped projections 9, affording bearings for transversely-disposed shafts 10 and 11. Provision is made for the vertical adjustment of said shafts by providing the uprights 8 with a sufficient number of hooks or bearings, said shafts being readily shifted from one to another of said bearings. The bolts or fastening means whereby the uprights 8 are secured upon the upper sides of the frame members 3 also serve for the attachment to the under sides of said frame members of boxes $12^b$, in which the shafts 10 and 11 may be journaled when it shall be desired to support said shafts below the level of the frame. The front shaft 10 carries at one end a sprocket-wheel 12, which is connected by a chain 13 with a sprocket-wheel 14 upon one of the ground-wheels 2, from which motion will thus be transmitted to said shaft. When the latter is raised or lowered, the length of the chain may be adjusted by adding or detaching links, as may be required. The shafts 10 and 11 are each provided with sprocket-wheels 15 16, connected by a chain 17, whereby motion will be transmitted from the shaft 10 to the shaft 11. The latter also carries a balance-wheel 18.

The machine is intended to be made of sufficient width to straddle two rows of plants, although it is desired to be understood that no limitation is made in this respect. The machine will likewise be made of dimensions which will enable it to straddle rows of plants growing at different distances apart. In the drawings hereto attached a two-row machine has been shown. Each of the shafts 10 and 11 carries a pair of hubs 19, suitably spaced apart and provided with radially-extending arms 20, the outer ends of which are equipped with wings or beaters 21. Said arms are preferably threaded into the hubs, as shown in the detail view, Fig. 4, as by this construction the said arms may be readily adjusted to place the wings or beaters at any desired angle to the axis of the drum. The beater-carrying shafts are to be adjusted in such a manner as to top the plants that are to be operated upon by about four inches, so that said plants, as the machine progresses, will be wiped and agitated by the beaters, with the effect of dislodging the insects and causing them to drop into receptacles provided for the purpose, as will now be described.

The cross-bar 4 of the machine is provided with clips 22, having transverse pins 23, adapted to engage apertures 24 in bracket-arms 25, which by said pins are connected adjustably with said clips. The lower end of the arms 25 are securely connected with the pan-carrying frames or spiders 26, each of which is composed of a longitudinal central bar or member 27, having cross-pieces 28, provided with upturned ends 29, between which a pan 30 may be detachably supported. Three pans are used in a two-row machine, the central pan being supported between the rows of plants and the outer pans adjacent to the outer sides of the rows. Said pans are preferably made tapering at their front ends, so that the plants will be guided between the pans without injury. These pans, as will be seen, are supported in such a manner as to receive all the insects and infested parts which are dislodged from the plants by the action of the beaters. If desired, the pans may in practice be partly filled with liquid, such as crude oil or other material destructive to insect life.

Suitably attached to the side members 3 of the frame, at the front ends thereof, are lamp-supporting brackets 33, upon which lamps may be placed for the purpose of guiding the operator when the machine is used after nightfall, at which time it is considered that it may be most profitably employed.

From the foregoing description, taken in connection with the drawings hereto annexed, the operation and advantages of this invention will be readily understood. The operation of the device is extremely simple, since the machine, which is light enough to be propelled by one animal, simply requires to be properly guided along the rows of plants. When thus guided, motion will be transmitted to the beater-carrying shafts by the means herein described, and the insects being dislodged will drop into the pans or receptacles, which latter whenever desired may be easily detached from the supporting-frame and emptied of their contents, which may then be destroyed in any convenient manner. The construction of the machine is simple and inexpensive, it is light and easily propelled, and the beater-carrying shafts may be readily adjusted to operate upon plants in various stages of growth.

Having thus described the invention, what is claimed is—

1. In a machine of the class described, a wheel-supported arched axle, side bars connected with and extending rearwardly from said axle, beater-carrying shafts supported upon said side bars, and a wheel-carrying yoke connected with and extending downwardly and rearwardly from the axle.

2. In a machine of the class described, a wheel-supported arched axle, a wheel-carrying yoke connected with and extending downwardly and rearwardly from said axle, side members extending rearwardly from the axle, a cross-bar supported upon said side bars, beater-carrying shafts supported upon the side bars, and pan-carrying frames connected adjustably with the cross-bar.

3. In a machine of the class described, a wheel-supported frame including an arched axle and side members connected with and extending rearwardly from the same, uprights supported upon said side members and provided, each, with a plurality of hooks forming bearings, beater-carrying shafts mounted adjustably in said bearings, means for transmitting motion to one of said shafts from a ground-wheel of the machine, and means for transmitting motion between said shafts.

4. In a machine of the class described, a frame, uprights supported upon said frame and provided each with a plurality of bearing-hooks, beater-carrying shafts supported adjustably in said hooks, and operating mechanism.

5. In a machine of the class described, a wheel-supported frame having a cross-bar provided with clips, in combination with bracket-arms connected adjustably with said clips, and pan-carrying frames or spiders supported by said bracket-arms.

6. In a machine of the class described, a pan-carrying frame or spider consisting of a central longitudinal member having cross-pieces provided with upturned ends, bracket-arms connected securely with the front end of the longitudinal member, and means for adjustably supporting said bracket-arms.

7. In a machine of the class described, a frame having side members, uprights supported upon the upper sides of the side members of said frame and having bearing-hooks, boxes disposed against the under sides of said side members, connecting-bolts extending through the latter and securing said uprights and boxes, and beater-carrying shafts.

In testimony that I claim the foregoing as my own I have hereto affixed my signature in the presence of two witnesses.

ALFRED CLOSURE STILES.

Witnesses:
G. H. MARSHALL,
G. W. MELBANE.